United States Patent [19]
Lee

[11] Patent Number: 5,508,914
[45] Date of Patent: Apr. 16, 1996

[54] METHOD FOR CALCULATING STATIC CORRECTIONS FOR SEISMIC DATA

[75] Inventor: Seongbok Lee, Houston, Tex.

[73] Assignee: Western Atlas International, Inc., Houston, Tex.

[21] Appl. No.: 314,240

[22] Filed: Sep. 28, 1994

[51] Int. Cl.$^6$ .................................................. G06F 19/00
[52] U.S. Cl. ............................ 364/421; 367/68; 367/78
[58] Field of Search ...................................... 364/421, 422

[56] References Cited

PUBLICATIONS

Rothman, D. H., Nonlinear Invesion, Statistical Mechanics, and Residual Statics Estimation, Geophysics, v. 50, No. 12 (Dec. 1985), pp. 2784–2796.

Ronen, J. Claerbout, J. F., Surface–Consistent Residual Statics Estimation by Stack–Power Maximization, Geophysics, v. 50, No. 12 (Dec. 1985), pp. 2759–2767.

Rothman, D. H., Automatic Estimation of Large Residual Statics Corrections, Geophysics, v. 51, No. 2 (Feb. 1986), pp. 332–346.

*Primary Examiner*—Donald E. McElheny, Jr.
*Attorney, Agent, or Firm*—William A. Knox

[57] ABSTRACT

An efficient method for evaluating static corrections based upon molecular dynamics simulation. This approach combines the global minimization mechanism of simulated annealing and the deterministic approach of molecular dynamics simulation and finds the surface-consistent source and receiver static corrections by minimizing the objective function. The objective function is a measure of the reflection coherency of the whole data set.

4 Claims, 5 Drawing Sheets

5,508,914

METHOD FOR CALCULATING STATIC CORRECTIONS FOR SEISMIC DATA

BACKGROUND OF THE INVENTION

1. Field of the Invention

Disclosed is a method for calculating static corrections for seismic data by minimizing an objective function. The surface consistent source and receiver statics that maximize the coherence of reflections are determined by simulating the crystallization process of a system of fictitious classical particles whose interaction potential is given by the objective function.

2. Discussion of Related Art

Seismic exploration provides a means for imaging in great detail, the structural configuration of subsurface earth layers. As is well known, a plurality of several tens or several hundred seismic receivers are emplaced along a desired line of survey at spaced-apart intervals as a receiver spread. An acoustic source generates a wavefield at or near the surface of the earth. The wavefield propagates downwardly and impinges upon subsurface strata whence it returns to the surface where the reflected wavefield is detected by the seismic receivers which convert the seismic signals to varying electrical signals. The detected seismic signals are transmitted to a multichannel recording device over an electrical, optical or ethereal data communications link. The received signals are recorded on an archival storage medium of any desired type as a data set comprised of a plurality of raw, usually discretized, time scale recordings, one recording for each receiver or receiver group.

After suitable data processing, the members of the raw data set are converted to visual form to be displayed on a cross section as a series of side-by-side variable-amplitude or variable area time-scale oscillographic traces. The section depicts a two-dimensional cross section of the earth having the dimensions, vertically, of two-way travel time in seconds and spatially, along the horizontal axis, as a function of the receiver spacing as measured in desired units such as meters. Typical dimensions for a cross section created from a single data set might display reflection events embraced within a vertical travel time window of four to eight seconds or more, along a horizontal spread corresponding to fifty to one hundred receivers or receiver groups spaced, perhaps, 100 meters apart.

Each firing of the acoustic source is followed by a listening period of a desired length during which the reflected wave fields are recorded. The source and the receiver spread are moved along the line of survey by a multiple of the receiver spacing and the source is fired again to record another data set. That process is repeated until the entire length of the line or area of survey has been occupied.

Wind, vehicular and pedestrian traffic, microseisms and at sea, ship noise and environmental noise due to marine life, may seriously interfere with and obscure the desired reflection data. Furthermore, solid friction in the earth as well as wavefield scattering attenuate the reflected signals. For that reason, a multiplicity of traces from different shots resulting from the interaction of a plurality of cooperating sources and receivers, but having the same subsurface incident point, are gathered and combined together by use of various algorithms well known to the geophysical profession. Multiple coverage tends to destructively attenuate random noise but enhance coherent reflection data. One such method is referred to as a Common Mid Point stacking which will now be illustrated with reference to FIGS. 1–3.

In FIG. 1, acoustic source $3 located on surface 10 insonifies a subsurface earth layer such as 14 whence the wavefield is reflected therefrom along ray paths 16, 18, 20 to be detected by receivers R1, R2, R3. The reflected wavefield as seen by each receiver is recorded either in analog or digital format on a separate recording channel. The wavefield as recorded at each receiver station may be presented visually as plurality of oscillographic time scale traces, one trace per channel. The resulting exemplary set of three records represent a common source gather.

In FIG. 2, sources S1–S3 respectively insonify receiver R3, after wavefield reflection from interface 14 along ray paths 20, 22, 24. The resulting recordings represent a common receiver gather. Of course, sources S1–S3 also insonify receivers R1 and R2 but those ray paths have not been shown to avoid complicating the drawings.

Observe that the subsurface incident points are different for each source-receiver combinations of FIGS. 1 and 2. Assuming that interface 14 is flat, the three records from either the common source gather or the common receiver gather or all six records from both gathers could be combined or stacked together after correction for angularity (also called Normal Moveout or NMO), into a single, zero-offset relatively noise-free trace. In effect, that stacked trace is a raw gather created from the interaction between a plurality of cooperating seismic sources and receivers.

In actual field conditions interface 14 is not necessarily flat. Therefore a preferred process employs common midpoint stacking as now shown in FIG. 3.

In FIG. 3, ray paths are shown for source positions S1–S3 with respect to receiver positions R1–R3. The ray paths shown all converge at a common mid point 15. The surface separation between the respective sources and correspondingly numbered receivers is termed the offset. As can be seen readily, application of NMO to the respective ray paths would collapse them to zero-offset as represented on the surface by S0/R0 to form two-way travel path 26 impinging on common mid point 15. In this case of zero dip, mid point 15 also forms a common depth point as well. Since all of the ray paths are incident on the same subsurface point, the traces can be stacked validly to enhance the signal-to-noise ratio.

Near-surface lateral velocity variations and surface elevation changes create travel-time variations that may be approximated by surface-consistent static time shifts. In FIG. 3 there are shown two subsurface earth layers, separated by dashed line 12, characterized respectively by acoustic propagation velocities of $V_0$=1500 meters per second (m/s) and $V_1$=3100 m/s. $P_{si}$ and $P_{rj}$ indicate those portions of the near-vertical ray paths that traverse the variable-thickness upper low velocity layer, after ray bending due to Snell's law of refraction at the interface, beneath sources $S_i$ and receivers $R_j$. Because of a longer combined path length of $P_{s3}+P_{r3}$ through the low velocity layer, the total travel time for ray path S3–R3, after application of NMO, will be longer than the total travel time along a ray path such as S1–R1, corrected for NMO, where the combined ray path $P_{s1}+P_{r1}$ through the low velocity layer is shorter. It should be understood that under actual field conditions, even though the low-velocity segments of the total ray path are relatively short, travel-time differences are not negligible due to the very low velocity at or near the surface. The respective time delays $s_i$ and $r_j$ due to a variable-thickness low velocity layer are defined as the surface-consistent statics which must be applied as corrections to the reflection travel times prior to stacking for maximizing inter-trace reflection coherency as will be shown in connection with FIG. 4.

The relative thickness of the low velocity layer beneath the respective source and receiver stations is not necessarily known a priori. Therefore, the static corrections are estimated from the pattern of correlatable reflected events as seen on a set of a limited number of adjacent raw seismic traces. In FIG. 4, by way of example but not by way of limitation, there are shown three raw zero-offset seismic traces 28, 32, 36, each with a correlatable reflected event 30, 34, 38 respectively, corresponding to the two-way wavefield travel times between sources $S_i$ and receivers $R_j$ of FIG. 3. Using the reflection 30 on trace 28 as reference, the reflection pattern shows that reflection 34 is delayed by a static time difference equal to $\Delta t_1$ and reflection 38 of trace 36 is delayed by $\Delta t_2$, the relative delay times being due to the different ray-path lengths through the low velocity zone above interface 12 of FIG. 3 as explained above. The statics are termed surface-consistent because they are due to irregularities of the near-surface low velocity layer.

In the trivial example above, the relative static corrections were determinable by inspection. In the real world, in the presence of many thousands of seismic traces, many of indifferent or poor quality, the seismic traces are processed automatically by computer, by minimizing the root-mean-square error between the fitted travel times and the measured travel times in the least-squares sense. Other, more sophisticated methods employing simulated annealing based on Monte Carlo procedures or other generic algorithms have been proposed to improve the estimates and to minimize expensive computer processing time.

D. H. Rothman, in a paper entitled *Nonlinear Inversion, Statistical Mechanics and Residual Statics Estimation*, Geophysics, v. 50, n. 12, 1985, reformulates the residual statics problem as an optimization problem. He implemented a standard simulated annealing scheme based on Monte Carlo procedure in order to maximize the stack power which is a measure of the quality of a stack. He chose the random statics as the initial statics of the data. For a given station, a new random static is assigned and the stack power is recomputed. If the new static shift gives a higher stack power, the static shift is accepted for the given station. If the new static shift decreases the stack power, a random number is generated and compared with $\exp(-\Delta E/T)$ where $\Delta E$ is the change in stack power and T is the temperature of the system. If the random number is greater then $\exp(-\Delta E/T)$, the static is rejected. Otherwise the static shift is accepted as the new static although it decreases the stack power. The same procedure is repeated for all of the stations to complete an iteration. The iterations are repeated with appropriated annealing schedules, i.e., decreasing temperature. As the temperature decreases, $\exp(-\Delta E/T)$ decreases correspondingly and so does the acceptance rate. As the name suggests, the evolution of the Monte Carlo approach relies solely on luck (random numbers). Of course, a Monte Carlo approach will find the global maximum stack power if we try enough random numbers. But that requires an enormous amount of computer time.

In the same issue of Geophysics, Joshua Ronnen and J. F. Clarebout present a paper *Surface Consistent Residual Statics Estimation by Stack Power Maximization*. Here, each station is considered one at a time. First, all of the static shifts, except that for the current station, are fixed, then a search is made for that static shift which maximizes the stack power. The procedure is repeated for all of the stations, Unfortunately, that method frequently does not lead to a global maximum but leads to one of many local maxima.

Another drawback to the above methods is that stack power is not a good objective function. that is, a function that is to be maximized or minimized. As Ronnen and Clarebout showed in their paper, the arbitrary linear trend in statics will not change the stack power. As a result, the statics solution which maximizes the stack power, frequently gives a bad stacked section and it is almost impossible to remove a linear trend.

In a later paper, published in Geophysics, v. 51, n.2, 1986, Rothman published a modification of his earlier method. He uses explicit cross correlation of traces instead of simply picking peaks of the cross-correlation functions and transforms the cross-correlation functions to probability distributions and then draws random numbers from the distributions. Estimates of statics are iteratively updated until convergence to the optimal stack is achieved.

The methods cited above are expensive of computer time. There is a need for a more economical deterministic computation method for estimating the residual statics for massive numbers of seismic traces.

SUMMARY OF THE INVENTION

A stacked gather of raw seismic traces are generated from the interaction between a plurality of cooperating seismic sources and receivers that are located at predetermined stations in sequential order. The raw traces are perturbed by surface-consistent static time shifts. A process is provided for maximizing the modified stack power which is a measure of inter-trace reflection coherency. The sources and receivers are modeled as a dynamical system of one-dimensional interacting particles that have coordinates proportional to the static time shifts. The particles are assigned a fictitious unit mass. The interaction potential of the system is proportional to the modified stack power of the raw seismic traces. In the modeled system the coordinates of the particles are iteratively altered in the direction of an applied force that is proportional to the negative gradient of the interaction potential. The iterations are continued with an appropriate annealing schedule, having preselected constraints in the alteration of the coordinates between adjacent stations, until the system reaches a ground state where the applied forces substantially vanish and the modified stack power becomes maximal. The coordinate values that exist when the system reaches ground state are taken as final and are applied to the raw traces as static corrections to convert the raw seismic traces into a display of coherent seismic traces.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

In the molecular dynamical simulated annealing approach of this method, the global minimization mechanism of the crystallization process is mimicked to solve the complex optimization problem of many parameters. If some material is heated to melt and cooled down slowly, maintaining the equilibrium without any disturbances, the material crystallizes and reaches the global minimum of the total energy (ground state). In this process, the high temperature of the melted material supplies enough kinetic energy for the individual atom to overcome the possible potential barrier or the high mixing enthalpy. During this process, each atom repositions itself until it does not feel any further force. In the molecular dynamics simulation approach, the crystallization process is closely imitated with the following assumptions: (1) that the statics are surface consistent, (2) within preselected constraints, the best statics minimize the objective function and (3) wide-angle ray-path geometry is absent such that the wavefront emergent angle is minimal.

The static problem is considered to be a system of one-dimensional interacting particles whose potential is given by an objective function. Each source or receiver station is considered as a particle with mass. The static time shift at each station is considered to be a coordinate of the particle. The static problem now is transformed into finding the equilibrium configuration of the ground state of a dynamical system of fictitious classical particles. In the molecular dynamics concept, each particle is visited and the force, that is, the negative gradient of the interaction potential is calculated. When there is a nonzero force, the particle is moved along the direction of the force according to the equation of motion. Repeating this process for all source and receiver stations completes the iteration. The iterations are repeated until the system reaches equilibrium. At equilibrium, the particles have gained kinetic energy by lowering their potential energy. The annealing process starts by reducing the kinetic energy slowly. The whole process is repeated until the forces on the particles vanish or become negligible. Eventually, the system reaches ground state and the particles come to rest. The final coordinates are the static corrections that minimize the objective function.

Figure 1:
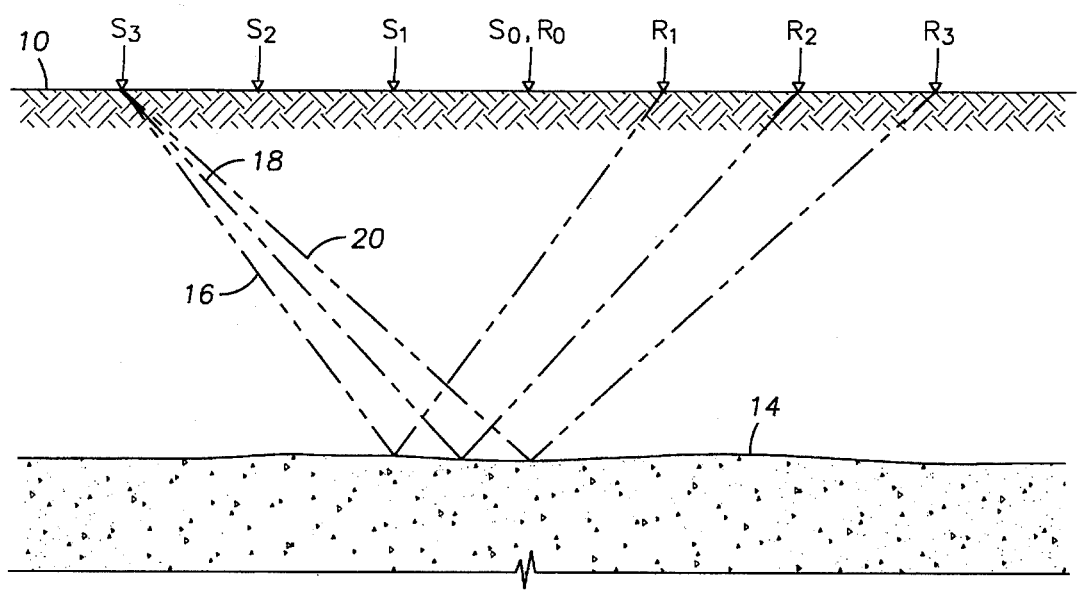
FIG. 1 illustrates a common source gather.
Figure 2:
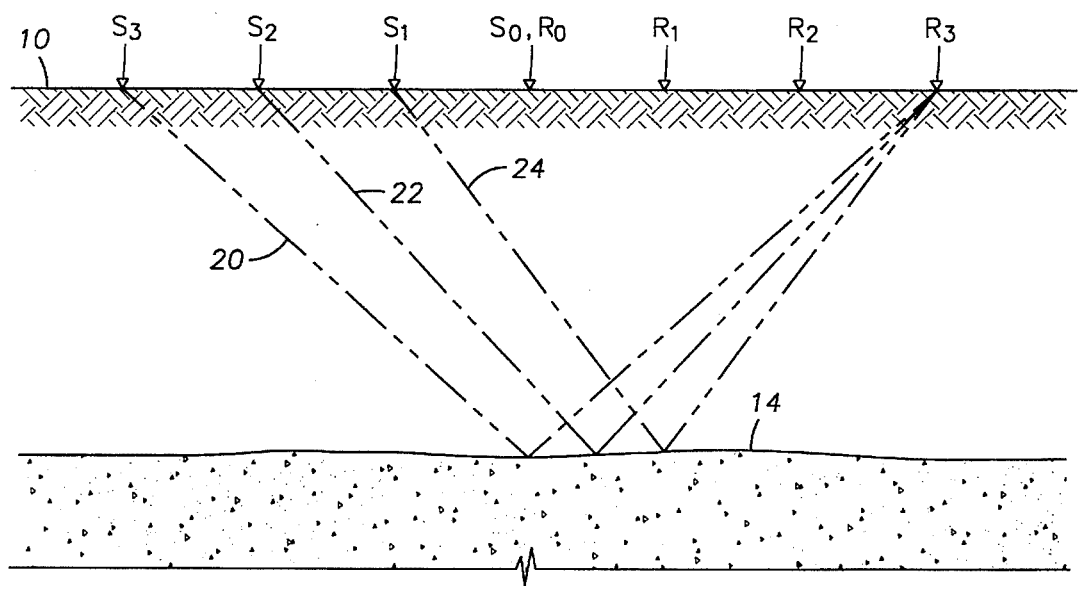
FIG. 2 is illustrative of a common receiver gather.
Figure 3:
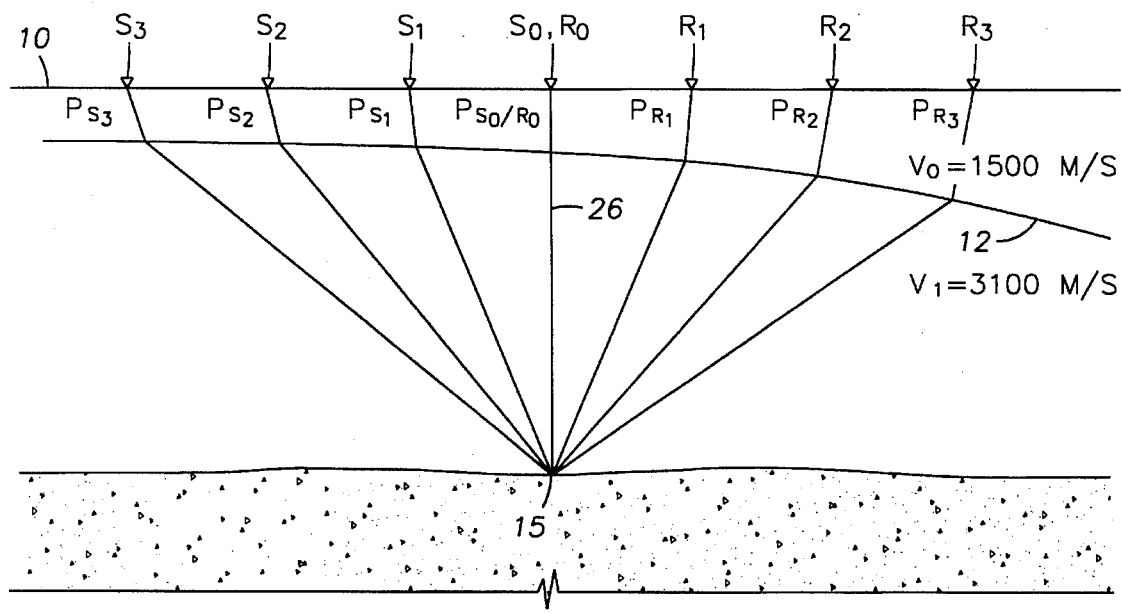
FIG. 3 illustrates seismic traces referred to a common mid point in the presence of an irregular low velocity layer.
Figure 4:
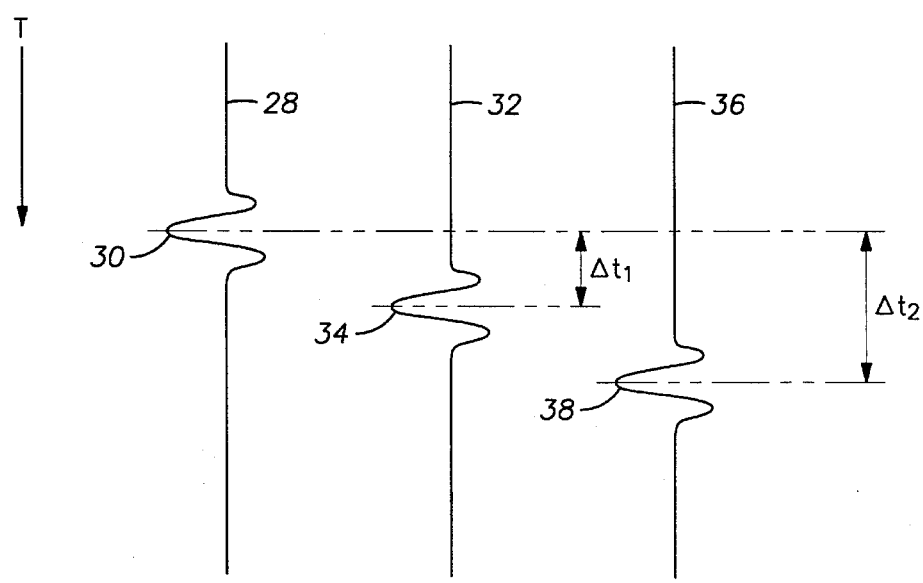
FIG. 4 shows a set of three adjacent seismic traces that exhibit a pattern of surface-consistent residual static time delays.

The objective function is defined to be the negative of the normalized correlation between a trace and a weighted sum of a variable number of adjacent stacked traces summed over all traces. In other words, the objective function is the negative of the modified stack power. It depends upon the static time shifts of all sources and receivers. Suppose $d_{i,j}(t)$ is a trace recorded from source station i to receiver station j and $s_i$ and $r_3$ respectively denote the surface-consistent static time shifts at the source and receiver locations as explained with respect to FIG. 3. The objective function is defined by $$E[(s_i),(r_j)] = -\frac{1}{M} \sum_{i,j} \sum_{t} \frac{1}{\sqrt{N}} d_{i,j}(t+s_i+r_j) y_{ij}^k \quad (1)$$

where M is the total number of traces, k is the CMP number, $y_{ij}^k(t)$ is the weighted sum of three stacked traces whose CMP numbers are k−1, k, k+1, with weights $w^n$ but excluding trace $d_{ij}(t)$. Thus, $$y_{ij}^k = \sum_{n=k-1}^{k+1} w^n s^n(t) - d_{ij}(t) \quad (2)$$

where $s^n(t)$ represents the stacked trace formed by the sum of all traces in CMP gather n. Typically, $w^n$=¼, ½, ¼ for k=n−1, k, k=n+1 respectively. Note that when $w^n$=0 for n=k−1 and n=k+1, then the objective function is simply the negative of the normalized stack power. N is a normalization constant that is determined from $$N = \left( \sum_t |d_{ij}(t+s_i+r_j)|^2 \right) * \left( \sum_t |y_{ij}^k(t)|^2 \right) \quad (3)$$

Because the objective function $E[(s_i),(r_j)]$ is normalized, its value varies between −1 and +1. The closer the function approaches −1, the better is the data quality. In practice, a value of −0.6 to −0.3 may be expected for good-quality data. The superscripts k and n are indices, not exponents.

The Lagrangian of the system is $$L = \sum_i 1/2 m \dot{s}_i^2 + \sum_j 1/2 m \dot{r}_j^2 - E[(s_i),(r_j)] \quad (4)$$

where m is an arbitrary parameter analogous to the mass of a particle. The dot indicates the first time derivatives of $s_i$ and $r_j$, the source and receiver displacements, which have the dimensions of velocity in milliseconds per millisecond (ms/ms). The kinetic energy of the system is the sum of the first two terms and is set to the temperature of the system. The equations of motion for the source statics are derived from the Lagrangian $$m\ddot{s} = -\frac{\partial E}{\partial s_i} \quad (5)$$

Similarly, the equation of motion for the receiver statics:

$$m\ddot{r}_j = -\frac{\partial E}{\partial r_j} \quad (6)$$

where the double dots indicate the second time derivative of the static displacements which have the dimensions of the force, m*(ms/ms$^2$), mentioned earlier.

The equations of motion, initialized with zero velocities and zero coordinates (statics), are solved by iteratively altering the coordinates of the fictitious particles in the direction of the applied force as above determined, that is proportional to the negative gradient of the interaction potential. An appropriate annealing schedule is used with an incremental time step of 0.05 ms with the mass of a fictitious particle being set to $1.0 \times 10^{-5}$ which may vary with the data. The iterations terminate when the objective function converges to a minimum but the total allowable coordinate alteration (time shift) is required to remain within preselected bounds such as ±100 ms. A further constraint is imposed on the maximum relative time shift that may be accepted between any two adjacent stations for the purpose of preventing cycle-skipping. The relative time shift between stations is constrained from exceeding the length of the dominant period of the seismic reflection data on a raw seismic trace gather.

Figure 5:
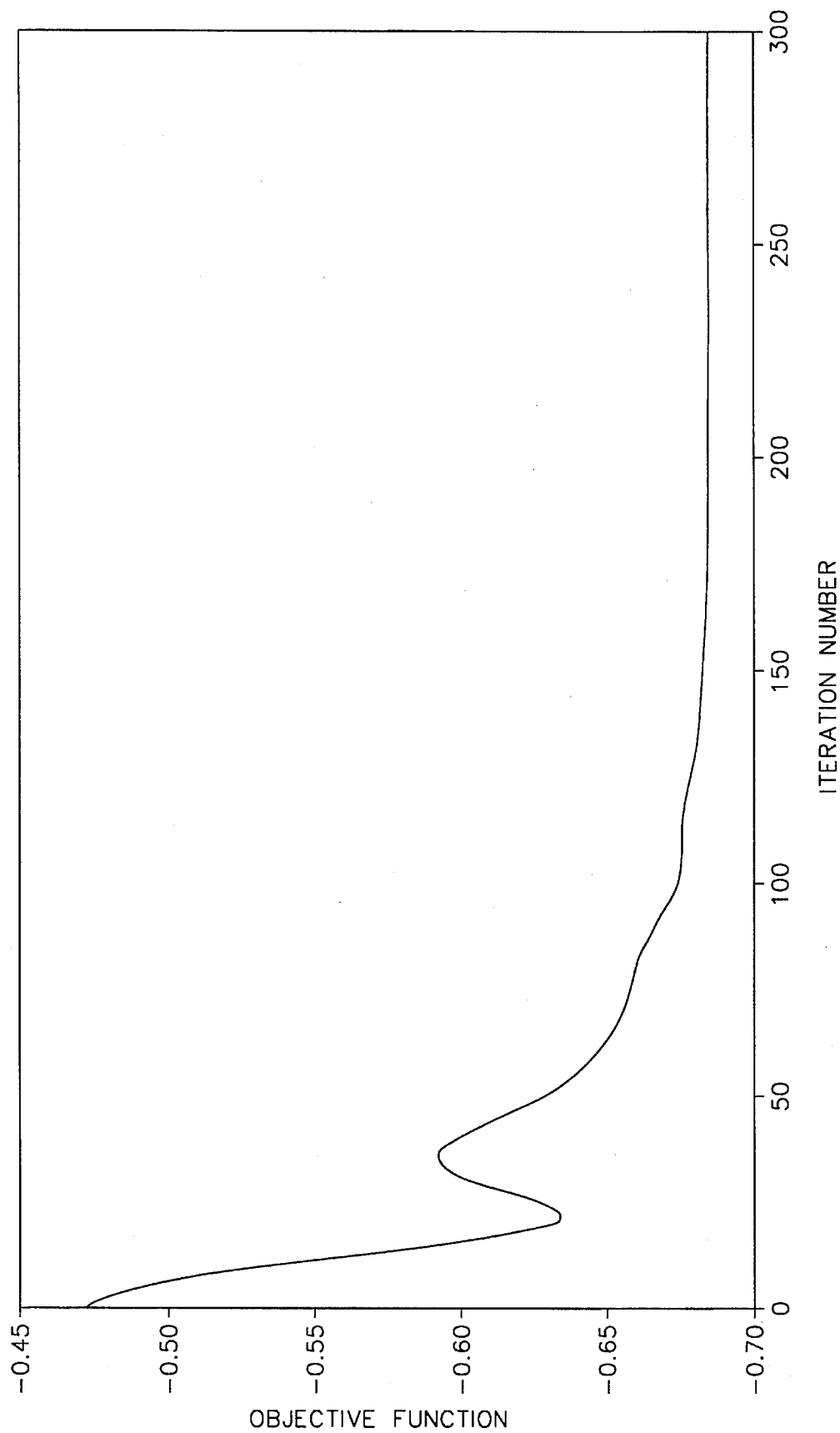
FIG. 5 is a graph showing the convergence of the objective function with respect the iteration number.

The best mode of operation is best discussed with reference to FIG. 5 which is a graph of the objective function plotted with respect to iteration number. For the first 20 equilibrating iterations, the particles seek equilibrium positions. Thereafter, without the damping effect of an applied annealing schedule, the objective function would oscillate about some value but would not converge. By applying an annealing schedule, the objective function converges to a minimal value after about 150 iterations.

Once the new statics and velocity are obtained by integrating the equations of motion, all traces which are related to the current station and their stacked traces within a desired time window are updated by shifting the samples in time using an interpolation scheme such as Lagrange's five-point interpolation formula or a Fast Fourier Transform (FFT). The objective-function normalization constants and time derivatives are also updated. That step is repeated for all source stations and receiver stations in sequential order. Next, the complete procedure is repeated iteratively with an appropriate annealing schedule until no meaningful change is reported for the objective function or a numerical iteration limit is reached. At this zero temperature, the velocities are zero and the gradients of objective-function E vanish. Thus, the system reaches the ground state of the minimal objective function at zero temperature and the coordinates of the particles represent the final static time shifts. The final static time shifts are then applied to the concerned traces as static corrections.

Figure 6:
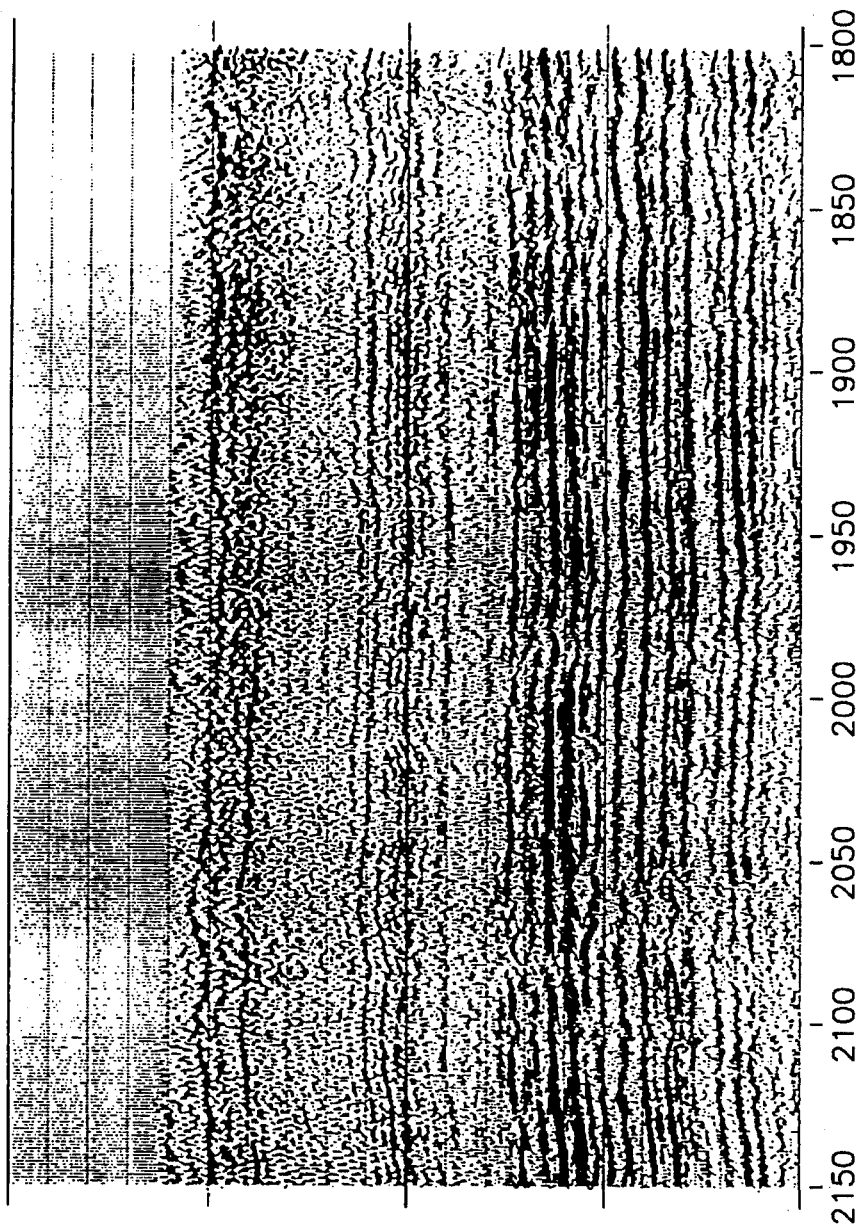
FIG. 6 is an example of a raw common mid-point CMP gather of real data.

FIG. 6 illustrates a CMP stack of raw seismic traces representing real data, which are perturbed by irregular static time shifts. The vertical coordinate is two-way travel time in seconds; the horizontal axis is marked by CMP numbers from right to left.

Figure 7:
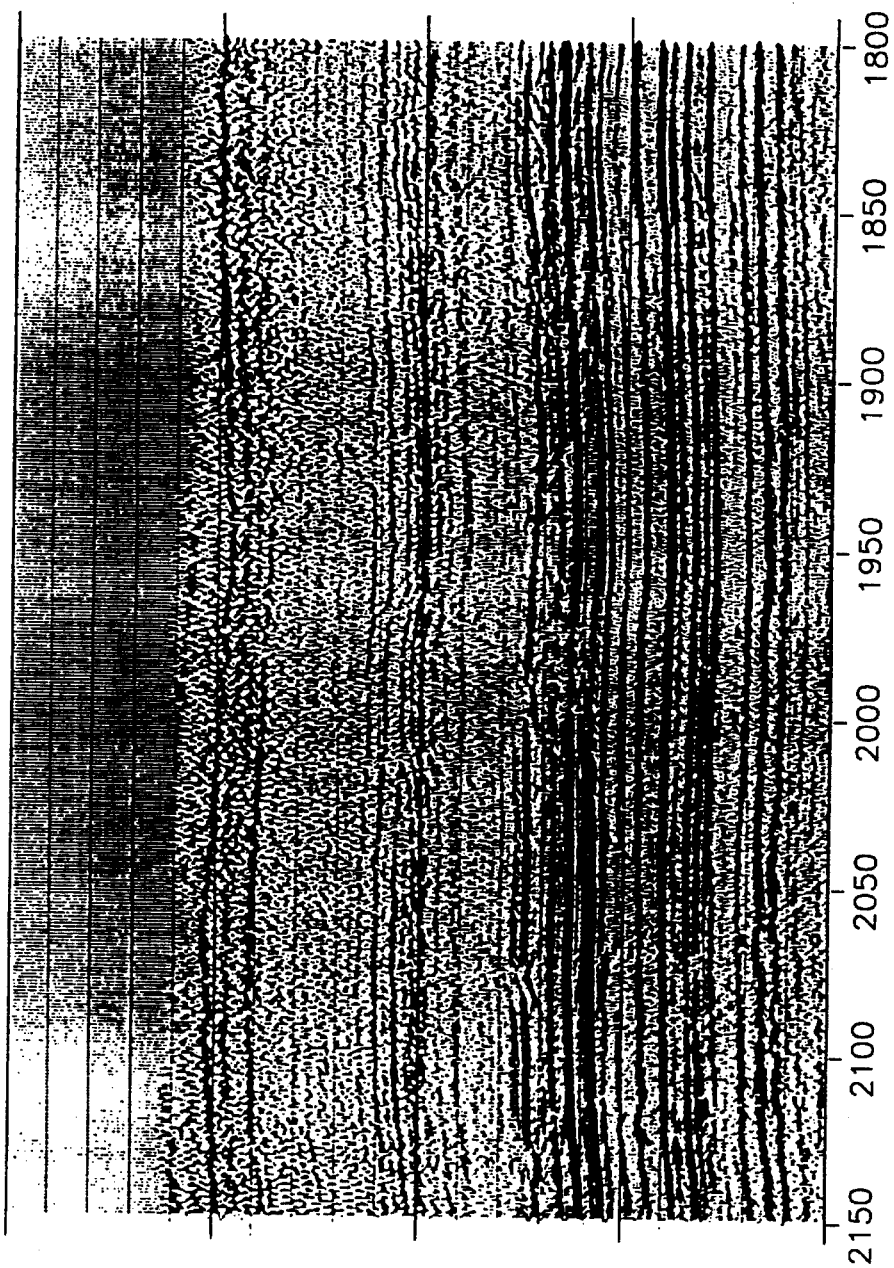
FIG. 7 is the example of FIG. 6 after applying the principles of these teachings.

FIG. 7 illustrates the same set of traces following application of the method of this invention. The coherency of the reflections in the zone centered around 1.0 second is substantially improved. The reflection band just beneath 0.5 second stands out significantly better and the false syncline at about CMP number 2080 no longer exists.

This foregoing has been presented with some degree of specificity by way of example but not by way of limitation. Others skilled in the art may employ other pathways to reach the conclusions presented here but which will fall within the metes and bounds of this invention which is limited only by the appended claims.

What is claimed is:

1. In a stacked gather of raw seismic traces created from interaction between a plurality of cooperating seismic sources and receivers located sequentially at predetermined stations, said raw seismic traces being perturbed by surface-consistent static time shifts, a process for maximizing the inter-trace reflection coherency, said reflection coherency being proportional to a modified stack power, comprising:

modeling said sources and receivers as a dynamical system of one dimensional interacting particles having coordinates proportional to said static time shifts, said particles being assigned a fictitious mass, said system having an interaction potential proportional to the modified stack power of said gather;

iteratively altering the coordinates of said particles in the direction of an applied force proportional the negative gradient of said interaction potential with a predetermined annealing schedule until said system reaches an equilibrium ground state where said applied force substantially vanishes and said modified stack power becomes maximal;

accepting as final, the coordinates of said particles existing at said ground state; and applying the final coordinates to said raw seismic trace gather as static corrections to convert said raw seismic traces to a display of coherent seismic traces.

2. The method as defined by claim 1, comprising the further steps of:

within an iteration, constraining a coordinate-alteration change between any two adjacent stations from exceeding a time shift equal to the dominant period of the of the reflections appearing on said raw traces; and constraining the final coordinates to remain within a preselected time range.

3. The method as defined by claim 2, wherein the modified stack power is given by an objective function having the form $$E[(s_i),(r_j)] = -\frac{1}{M} \sum_{i,j} \sum_t \frac{1}{\sqrt{N}} d_{ij}(t + s_i + r_j) y_{ij}^k,$$

where M is the total number of traces, k is the CMP number, $y_{ij}^k(t)$ is the weighted sum of three stacked traces whose CMP numbers are k−1, k, k+1, with weights $w^n$ excluding trace $d_{ij}(t)$ and $$y_{ij}^k = \sum_{n=k-1}^{k+1} w^n s^n(t) - d_{ij}(t),$$

where $s^n(t)$ represents the stacked trace formed by the sum of all traces in CMP gather n;

N is a normalization constant that is determined from $$N = \left( \sum_t |d_{ij}(t + s_i + r_j)|^2 \right) * \left( \sum_t |y_{ij}^k(t)|^2 \right),$$

superscripts k and n being indices.

4. The method as defined by claim 3, wherein:

the Lagrangian of the system is given by $$L = \sum_i 1/2 m \dot{s}_i^2 + \sum_j 1/2 m \dot{r}_j^2 - E[(s_i),(r_j)],$$

where m is analogous to the mass of a fictitious particle;

the equations of motion for the source and receiver statics are derived from the Lagrangian $$m\ddot{s}_i = -\frac{\partial E}{\partial s_i}$$

and $$m\ddot{r}_j = -\frac{\partial E}{\partial r_j},$$

which define said applied force m*(ms/ms²) acting on said fictitious particles.

\* \* \* \* \*